United States Patent [19]

Horsten

[11] 3,727,188

[45] Apr. 10, 1973

[54] FAST SELECTION UNIT FOR STORES

[75] Inventor: Johannes Bernardus Horsten, Beekbergen, Netherlands

[73] Assignee: U.S. Philips Corporation, New York, N.Y.

[22] Filed: July 12, 1971

[21] Appl. No.: 161,504

[30] Foreign Application Priority Data

July 15, 1970 Netherlands ..........................701432

[52] U.S. Cl. ................................340/166 R, 307/268

[51] Int. Cl. ............................G11c 7/00, H03k 5/01

[58] Field of Search .......................340/166 R, 173 R; 307/260, 263, 268, 270

[56] References Cited

UNITED STATES PATENTS 3,609,405 9/1971 Surprise ..............................307/263
3,470,391 9/1969 Granger ..............................307/270
3,451,048 6/1969 Strehl ..............................307/270 X
3,445,831 5/1969 Cooper et al. ....................307/270 X
3,365,587 1/1968 Baur ....................................307/263

*Primary Examiner*—Donald J. Yusko
*Attorney*—Frank R. Trifari

[57] ABSTRACT

In a store information is written or read by means of short current pulses in selected conductors which are associated with given storage elements. Used as switching elements are transistors which in the conducting state, however, can store a large charge in the base-emitter capacitance. For quick depletion of this charge a second transistor is brought to the conducting state for a short period at the end of the current pulse.

7 Claims, 7 Drawing Figures

INVENTOR.
JOHANNES B. HORSTEN

BY
Frank R. Trifari
AGENT

INVENTOR.
JOHANNES B. HORSTEN

BY Frank R. Trifari
AGENT

INVENTOR.
JOHANNES B. HORSTEN

BY
Frank R. Trifari
AGENT

INVENTOR.
JOHANNES B. HORSTEN

BY [signature]

AGENT

FAST SELECTION UNIT FOR STORES

The invention relates to a fast selection unit for selecting at least one storage element of a store in which information can be electrically stored in a binary form, comprising at least one selection transistor having a base electrode to which a selection pulse can be applied, and an emitter electrode through which a current pulse generated by a generator can be conducted, the emitter electrode being connected to the generator during a stand-by period, the coexistance of this connection and the selection pulse bringing the selection transistor to the conducting state so that said storage element is selected, at least one second transistor also being connected to the base electrode of the selection transistor.

Selection units of this kind are used, for example, for matrix stores. The operation of these stores is based on the fact that current pulses in at least one of the conductors associated with a storage element change the state of this element such that information can be written in or read out. The requirements imposed as regards the operating speed of such a store become increasingly more stringent and hence also the requirements as regards the shape of the current pulses. These pulses must have a flat peak and steep edges. In the case of a pulse duration of approximately 30 nanoseconds, particularly a steep trailing edge is difficult to make as the charge stored in the base-emitter capacitance of the selection transistor is to be depleted. This might be effected by means of a resistor having a low resistive value. The dissipation thus produced is a drawback, particularly in cases where a voltage drop would also occur across this resistor in the non-selected state. In order to be able to deplete the charge quickly, the invention is characterized in that the base electrode of the second transistor is connected to the output of a differentiating network to an input of which the selection pulse is applied, whereby the differentiated selection pulse causes at the end of the selection period said second transistor to conduct temporarily, so that the charge present in the base of the selection transistor is depleted via the low resistivity emitter-collector path of the second transistor. As a result, the current pulse can be properly defined at the leading and the trailing edge.

The use of drive means for depleting the base charge of a transistor which has been in the conducting state is known from the Netherlands Patent Application 6900697. In FIG. 2 of this Application the transistor $T_1$ is selected. When $T_2$ is cut off, the base-collector capacitance of $T_2$ is discharged in that the multi-emitter transistor $T_1$ is brought to the conducting state during a period $R_1 C_p$. The voltage on the base of $T_1$ will still be high during this delay time, so that the base charge of $T_2$ is depleted in an accelerated manner.

In accordance with the present invention the selection transistor itself is brought to the conducting stage so that the charge in the base thereof is to be depleted by the second transistor; in the above-mentioned Netherlands Patent Application, however, the roles are reversed. In the method described in said Netherlands Patent Application the sensitivity to interference is reduced whilst in the present invention the dissipation in an otherwise necessary discharge resistor is avoided.

It is advantageous if the selection pulse is applied to the selection transistor via an emitter-follower so that the base lead of the selection transistor has a low resistive value. Then too the depletion of the charge via a resistor would cause an inadmissibly large dissipation therein. The switching-off of the selection pulse activates the differentiating network. In contrast with the invention the drive means mentioned in said Netherlands Patent Application may be considered as an integrating network. A final difference is that in the present Patent Application it is the base-emitter capacitance of the conducting transistor which is discharged.

A further embodiment according to the invention is characterized in that the generator is a current source, the stand-by period being terminated simultaneously with the selection pulse. The stand-by period can be terminated by opening a switch which is arranged in series with the current source.

A further embodiment according to the invention is characterized in that the generator is a voltage source having a first resistor in series, a resistor being arranged in the circuit which is formed by the emitter-follower and the emitter of the selection transistor. Said first resistor limits the current supply by the voltage source, whilst said resistor limits the current supply by the emitter-follower.

The invention may be used for selecting elements of a store. To this end an application of the invention for a store is characterized in that fast selection units as described are provided by means of which at least one element can be selected from at least a portion of the elements of the store.

Stores are frequently constructed with selection matrices. The invention can also be applied for these stores. One application of the invention is, therefore, a store having at least one selection matrix for the simultaneous selection of a series of storage elements, characterized in that the selection matrix consists of selection units according to the invention.

In order that the invention may be readily carried into effect, some embodiments thereof will now be described in detail, by way of example, with reference to the accompanying diagrammatic drawings, in which.

Figure 1:
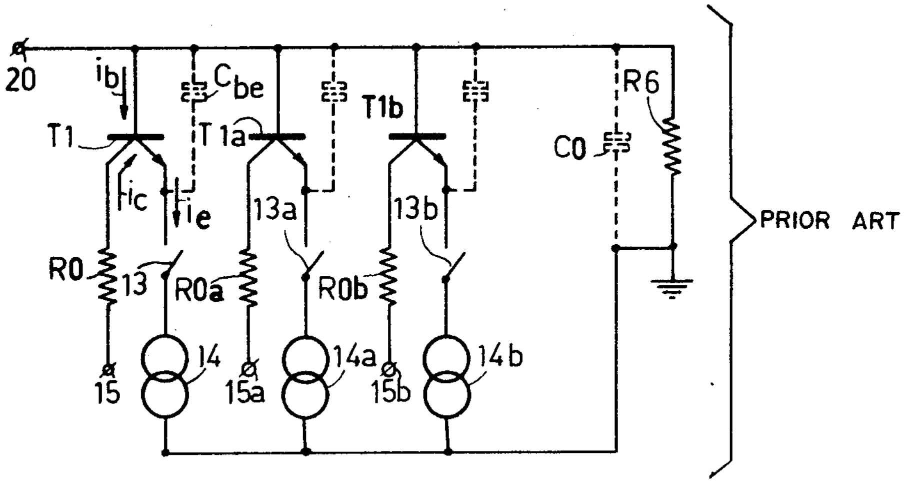
FIG. 1 shows a prior art selection unit.

FIG. 1 shows a prior art selection unit. Shown are the selection transistors $T_1$, $T_{1a}$, $T_{1b}$, the switches 13, **13*a*, 13*b*, the current sources 14, 14*a*, and 14*b***, the resistors R*o*, R*oa*, R*ob* and $R_8$, and the connection terminals 15, **15*a*, 15*b* and 20 and the parasitic capacitances $C_0$ and $C_{be}$. The selection pulse is applied to terminal 20, the terminal 15** is connected to the storage elements to be selected and having a substitution resistance of R*o*. The three transistors $T_1$, $T_{1a}$ and $T_{1b}$ are selected by the selection pulse. The closing of one of the switches 13, **13*a* or 13*b*** starts the stand-by period for the associated transistor, and said transistor becomes conducting, for example, $T_1$. The currents through base, emitter and collector of $T_1$ are denoted by $i_b$, $i_e$ and $i_c$. A current pulse as shown in FIG. 2c is required. In this Figure the time is plotted horizontally and the current is plotted vertically. The broken line denotes the collector current pulse $i_c$: this pulse has a flat peak and steep edges. The width is, for example, 30 ns, the width of the edges is 3 ns. During the pulse the transistor $T_1$ is to be properly bottomed, which keeps the voltage drop and hence the dissipation small.

A special characteristic of many transistors is that the current amplification ($\alpha' = |i_c/i_d|$) is low for high frequencies. For a half-sine period of 30 ns it may be, for example, 40 and for a period of some ns, it may be only 6. A quick rise of the collector current can, therefore, be achieved only by a large peak in the base current during the leading edge of the pulse. This is shown in FIG. 2b where the base current $i_b$ shows a peak having a height $i_{bf}$ during the leading edge of the current pulse in $i_c$. During the flat portion of said current pulse a lower base current suffices: $i_{bn}$. In practice, the selection transistors show a considerable spread. Therefore, the current source 14 is overproportioned so that it supplies a current $i_e$ during the entire pulse duration: $i_e = i_c + i_{bf}$. This is represented in FIG. 2c by the uninterrupted line. The base-emitter capacitance ($C_{be}$) of transistor $T_1$ is charged by the large base current $i_{bf}$. When the current pulse is switched off due to the opening of the switch 13 (end of stand-by period), this charge is slowly depleted via the base-collector lead. This produces a not very steep trailing edge of the current pulse (chain-link line in FIG. 2c). For the transistor BSX 59 the switching-off time may be, for example, 40 ns. Moreover, the switching-off time varies greatly.

A simple, known solution to this problem is the discharging of the base-emitter capacitance by means of a leakage resistor $R_6$ (FIG. 1). This solution has the drawback that the control current $i_b$, which had already been increased to $i_{bf}$, is to be increased still further in view of the losses introduced by this resistor $R_6$. It is obvious that a rather unfavorable compromise is to be found between a long switching-off time (value of $R_6$ large) and a large dissipation (value of $R_6$ small).

Figure 3:
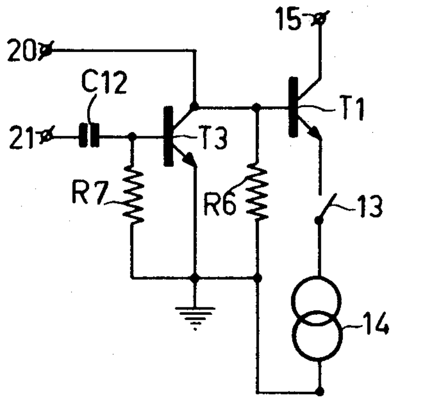
FIG. 3 shows a fast selection unit according to the invention, having a current source as a generator.

This dilemma is solved by the circuit arrangement according to the invention shown in FIG. 3. Corresponding components are denoted by the same reference numerals as in FIG. 1. The circuit arrangement, in addition, comprises a transistor $T_3$, a resistor $R_7$, a capacitor $C_{12}$, and two connection terminals 20 and 21. For the sake of simplicity, only one selection transistor is shown. The transistor $T_3$ is brought to the conducting state during a brief period at the end of the selection pulse, so that the charge of the base of $T_1$ is quickly depleted. It is thus achieved that the current pulse to the selected elements has steep edges in spite of its short duration.

The circuit operates as follows: in the rest position switch 13 is open and the base of $T_1$ has a low voltage so that $T_1$ is not conducting. The current source 14 has a voltage limitation which is not further described. Subsequently, $T_1$ is selected by a positive selection pulse on terminal 20. The switch 13 is then closed so that $T_1$ becomes conducting and the load connected to terminal 15, is selected. The current pulse ceases as the switch 13 is opened at the instant when the selection pulse ceases. Moreover, the selection pulse is applied to terminal 21 in an inverted form. The resistor $R_7$ and the capacitor $C_{12}$ together form a differentiating network so that the base voltage of $T_3$ becomes high during a period $R_7.C_{12}$. As a result, $T_3$ becomes conducting and the charge present in the base of $T_1$ is quickly depleted to earth. After approximately a period $R_7.C_{12}$, the base voltage of $T_3$ becomes low again and the base voltage of $T_1$ also becomes low again if $R_7$ and $C_{12}$ are properly proportioned.

Figure 2:
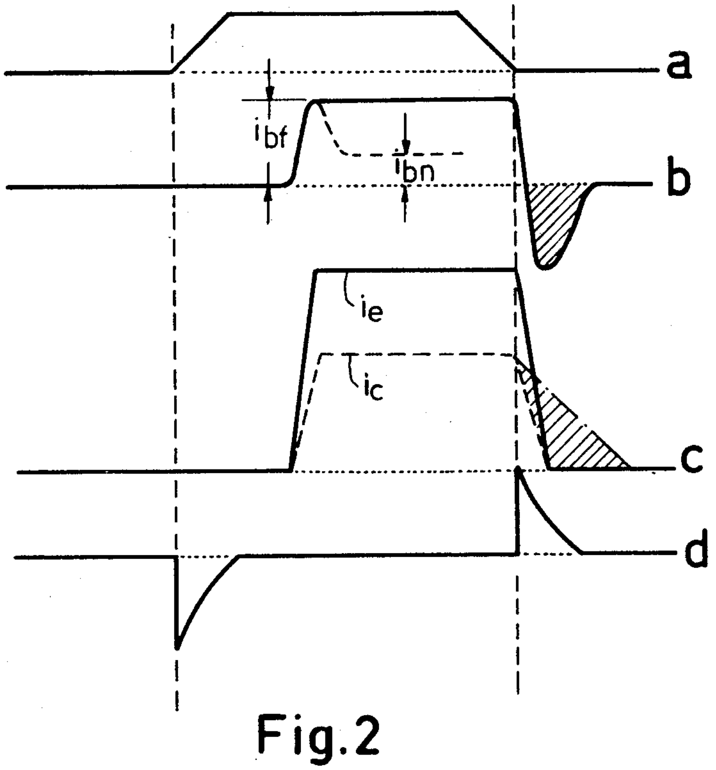
FIG. 2 shows a number of current and voltage waveforms in selection units.

The current and voltage pulses occurring in this circuit are shown in FIG. 2. FIG. 2a shows the selection-voltage pulse. FIG. 2b shows the base current of $T_1$. In this Figure the negative peak at the end (discharge current) is shaded. FIG. 2c shows the peak of the emitter current $i_e$ (solid line) and the collector current of $T_1$ (broken line). The improvement with respect to the prior art example without a second transistor is obvious. The shaded areas in FIGS. 2b and 2c are the same because charge is conserved. FIG. 2d shows the voltage on the base of $T_3$.

Like in FIG. 1, frequently a plurality of selection transistors is arranged in parallel, each transistor being provided with a current source and a switch. Each selection transistor performs a logical AND-function. Due to the large number of transistors, the capacitance $C_0$ of the selection line with respect to earth is also large. Therefore, the selection pulse should be supplied via a low impedance. Another reason for this is that the rather large current $i_{bf}$ is not to change the level of the base line in view of proper setting of the selection transistors.

Figure 4:
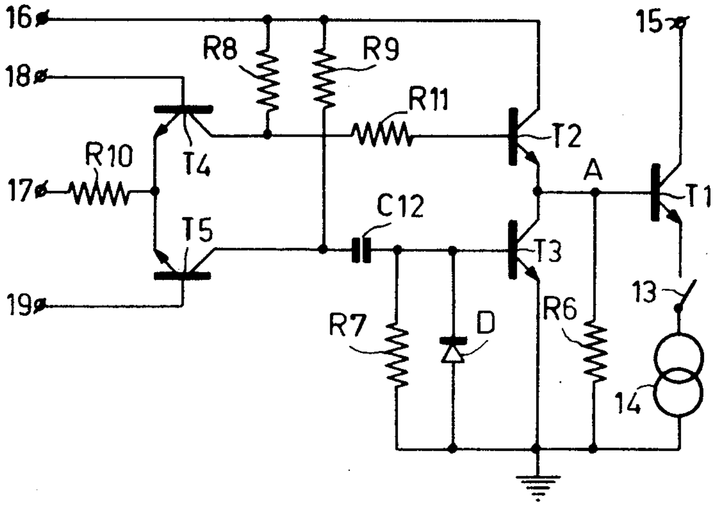
FIG. 4 shows another embodiment of the selection unit shown in FIG. 3.

Consequently, a favorable embodiment is that shown in FIG. 4.

In this Figure the following new elements are introduced: the transistors $T_2$, $T_4$ and $T_5$, the resistors $R_8$, $R_9$, $R_{10}$ and $R_{11}$, the diode D and the connection terminals 16, 17, 18 and 19. The operation is as follows: terminal 16 is connected to a high supply voltage, for example, +5 volts, and terminal 17 is connected to a low supply voltage, for example, −5 volts. The terminals 18 and 19 are connected to the output terminals of a bistable circuit not shown, so that one of these two terminals is always at a high voltage level and one is always at a low voltage level. In the non-selected state terminal 18 has a high voltage level so that $T_4$ is conducting. This causes a voltage drop across the resistor $R_8$ so that the base of $T_2$ has a low voltage level. Whether $T_2$ is conducting or not depends on the potential of the emitter. In principle it can be fully cut off, but in practice it is still slightly conducting in the rest state. In the meantime, a low voltage is present on terminal 19 so that transistor $T_5$ is not conducting and no current flows through resistor $R_9$. Consequently, a voltage of, for example, 5 volts is present across the plates of capacitor $C_{12}$, as one plate is at the same level as terminal 16, and the other plate is at earth potential.

In the "selected" state, terminal 18 has a low voltage level and terminal 19 has a high voltage level. Consequently, $T_5$ is conducting and $T_4$ is not conducting. As a result, the base voltage of $T_2$ is high and the emitter-collector circuit of this transistor is conducting. $R_6$ acts as a load because a voltage difference is present thereacross (in the above-mentioned case approximately 5 volts). A further result is that the base voltage of $T_1$ is high. The emitter and the base of $T_3$ have earth potential, and the collector has a high voltage. Consequently, this transistor is not conducting. The plate of $C_{12}$ on the side of $T_5$ has a low potential whilst the other plate is connected to earth. Consequently, $T_2$ is arranged as an emitter-follower so as to apply the selection pulse at a low resistive value. The further operation of the circuit is the same as that shown in FIG. 3. The only difference is that at the end of the selection pulse the base voltage of $T_2$ becomes low whilst the emitter voltage is still high. Therefore, as long as the charge of the base-emitter capacitance of $T_1$ is not depleted, transistor $T_2$ remains cut off. When this charge is depleted, it depends on the setting of $T_2$ whether the latter remains cut off or whether it becomes slightly conducting again.

In the circuit arrangement shown in FIG. 4, the differentiating network is further extended with a diode D so that the large negative peak on the base of transistor $T_3$ is short-circuited. The duration of this peak would otherwise be too long, as in that case the RC-time of the differentiating network is too long. In the case of a positive peak, the base-emitter junction of transistor $T_3$ is connected in parallel with resistor $R_7$ so that the RC-time is shorter. Consequently, the value of capacitor $C_{12}$ must be selected to be rather large. The long duration of the negative peak would cause the transistor not to open fast enough at the end of the selection. Due to the short-circuiting of the peak this drawback is eliminated. The value of the resistor $R_6$ is determined first of all by the aim for a small dissipation. However, it is not made infinitely large by leaving it out. This is because it is desirable that also in the non-selected state $T_2$ conducts some current as it can then be made conducting aster than faster this bias. Another reason is based on the fact that $R_6$ is often arranged at the end of a line (FIG. 1) which is preferably terminated with a value close to the characteristic impedance. This also results in a rather small value for $R_6$. If necessary, a frequency-dependent load may be taken for $R_6$, for example, a resistor and in parallel therewith a second resistor having a capacitance in series. The two resistors are then connected in parallel for high frequencies.

Figure 5:
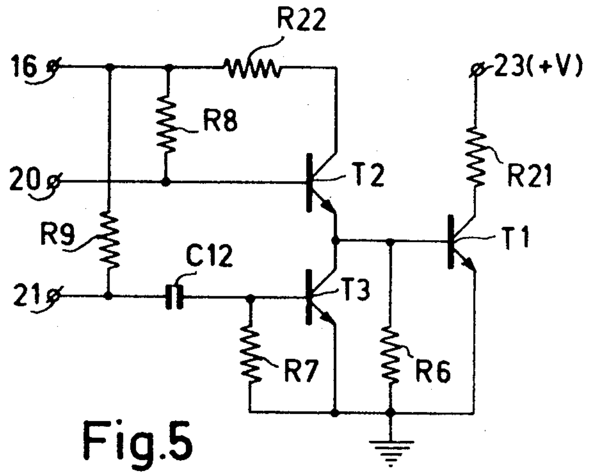
FIG. 5 shows a selection unit according to the invention, having a voltage source as a generator.

FIG. 5 shows a selection unit according to another embodiment, the additional components being the resistors $R_{21}$ and $R_{22}$ and the connection terminal 23. Connected to terminal 23 is a voltage source (+V). A selection unit of this type can be used in a circuit arrangement as shown in FIGS. 3 or 4 to replace the switch 13 and the current source 14. In this case the selection pulse brings the selection transistor to the conducting stage. A problem is that the emitter-collector circuit of transistor $T_1$ is a circuit of low resistive value so that the current may increase greatly and the load of these transistors may become too large. This is counteracted by an additional resistor in the collector circuit of $T_2$. For example, the elements connected to terminal 15 are selected by co-operation of two selection units according to the invention.

Figure 6:
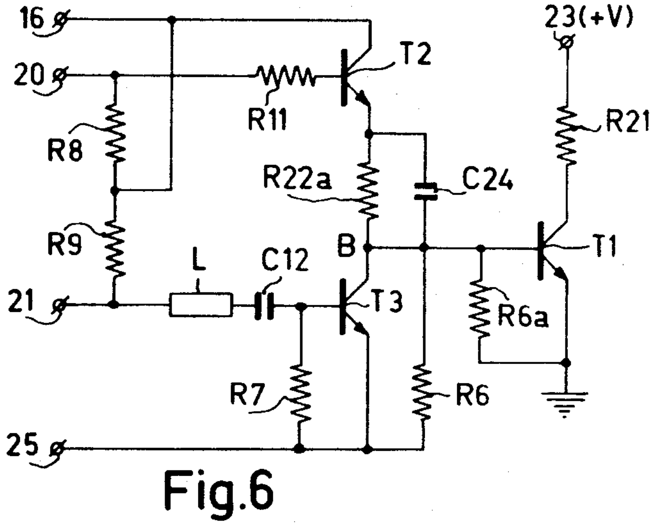
FIG. 6 shows another embodiment of the fast selection unit shown in FIG. 5.

In FIG. 6 the same is done in a different manner, the additional elements being the resistors $R_{6a}$ and $R_{22a}$, the capacitor $C_{24}$, the input terminal 25 and the delay line L. The current-limiting resistor $R_{22a}$ is connected between $T_2$ and the junction B, the quick supply of the selection pulse being achieved by connecting a coupling capacitor $C_{24}$ in parallel with the resistor $R_{22a}$. The use of the resistors $R_{22}$ (FIG. 5) and $R_{22a}$ is necessary particularly when the transistor $T_2$ is set such that it is also conducting in the non-selected state and, for example, junction B is slightly above earth level.

FIG. 6 shows some more modifications. A negative voltage is connected to terminal 25. As a result, the effect of bringing $T_3$ to the conducting state on the discharging of $T_1$ is further increased. Two resistors, $R_6$ and $R_{6a}$, ensure the correct setting of the transistors. Furthermore, a delay line L is connected in front of the differentiating network. This line serves to render transistor $T_3$ conducting after a short delay as otherwise the transistor $T_2$ would still be conducting so that a large dissipation might arise in these two transistors. This delay line might alternatively be executed as an integrating network. Finally, it would alternatively be possible to connect the current-limiting resistor ($R_{22}$ and $R_{22a}$, respectively) in the emitter lead of transistor $T_1$. In that case this resistor could even be combined with $R_{21}$. The choice of the location and the value of this resistor is governed by the desired setting of the various transistors.

Figure 7:
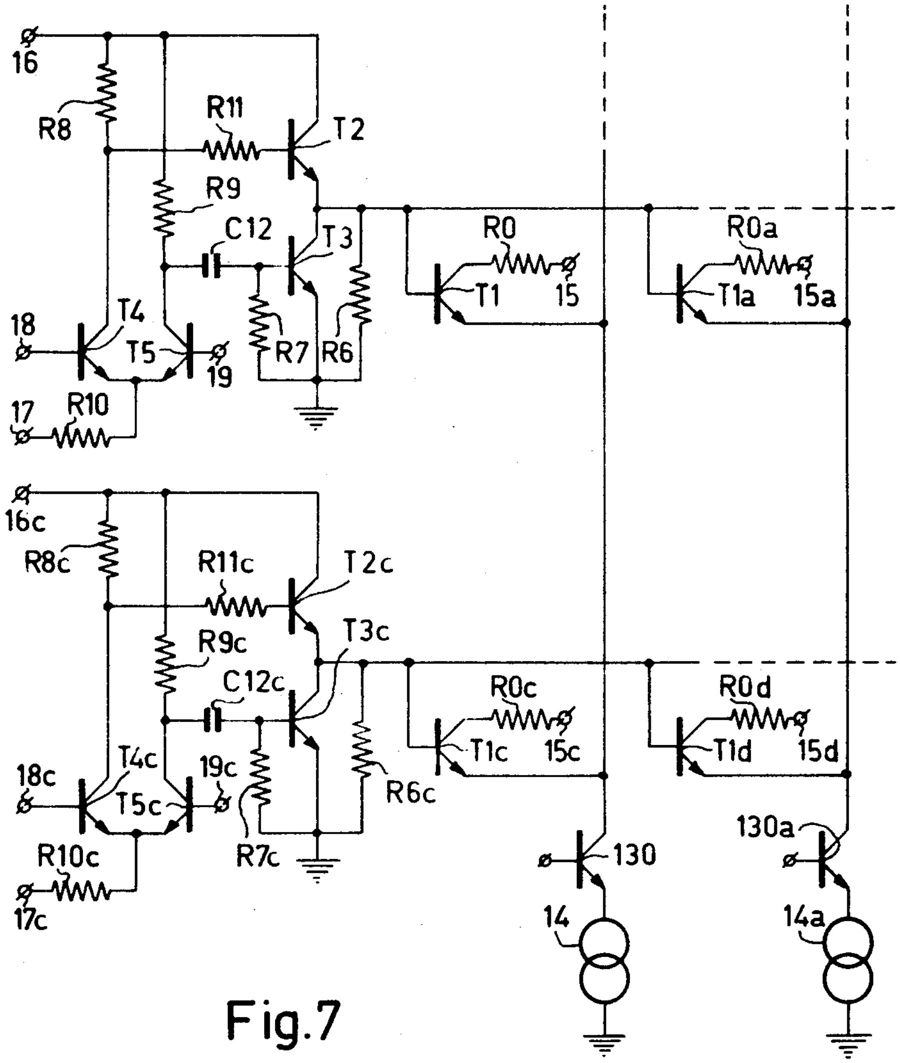
FIG. 7 shows a selection matrix for a store provided with selection units according to the invention.

Finally, an application of a selection unit in a matrix is shown in FIG. 7. The diode D has been omitted, but otherwise the construction is analogous to that of FIG. 4. The switches of the current sources 14, **14*a* are transistors which may again be constructed with selection units according to the invention. The function of the transistors 130 and 130*a* then corresponds to that of the transistors $T_1$, $T_{1a}$, etc. A number of storage elements can be selected together. For example, it is possible that when transistor $T_1$ becomes conducting, an information bit is stored in a storage element which is coupled directly to terminal 15. But it is equally possible that a number of elements is connected to terminal 15**, said elements being selected together. In this case, information is stored in a given element only if this element also forms part of a number of elements selected by a second selection matrix. Consequently, it may be that two selection matrices of 8 × 8 selection transistors are associated with one storage matrix of 64 × 64 elements. In this way, each element of the storage matrix is individually selectable.

It is possible to combine and modify the foregoing considerations. For example, it will be obvious that instead of NPN-transistors also PNP-transistors may be used. The various versions of the drive means for bringing the transistor $T_3$ to the conducting state can also be combined mutually, and with the various positions of the current-limiting resistor. Furthermore, the circuit can be executed completely or partly as an integrated circuit. Moreover, selection matrices may be used for a multi-dimensional store. This store itself may be provided with magnetic ring cores, with multi-hole elements, with biax elements or with magnetic film, and also with storage elements that store electrical information directly without conversion into magnetization of magnetic material, for example, semiconductor stores. Moreover, the storage elements as well as the conductors may be constructed in integrated techniques.

What is claimed is:

1. A fast selection unit for selecting at least one storage element of a store in which information can be electrically stored in a binary form, comprising at least one selection transistor having a base electrode to which a selection pulse can be applied, and an emitter electrode through which a current pulse generated by a generator can be conducted, the emitter electrode being connected to the generator during a stand-by period by means of switching means disposed between said generator and said emitter electrode, the coexistence of this connection and the selection pulse bringing the selection transistor to the conducting state so that said storage element is selected, at least one second transistor also being connected to the base electrode of the selection transistor, and a base electrode of the second transistor being connected to an output of a differentiating network, said differentiating network having an input to which the selection pulse is applied, said differentiating network creating a differentiated selection pulse at its output causing said second transistor to conduct temporarily at the end of the selection period, so that the charge present in the base of the selection transistor is depleted via a low resistivity emitter-collector path of the second transistor.

2. A fast selection unit as claimed in claim 1, wherein the generator is a current source, the stand-by period being terminated simultaneously with the selection pulse.

3. The fast selection unit of claim 1, wherein said store has at least one selection matrix for the simultaneous selection of a series of storage elements.

4. The fast selection unit of claim 1, wherein said differentiating network comprises a diode connected across a resistor of said differentiating network.

5. A fast selection unit for selecting at least one storage element of a store in which information can be electrically stored in binary form, comprising:

at least one selection transistor having base, collector, and emitter electrodes;

a second transistor having base, collector, and emitter electrodes, the base electrode of said selection transistor being connected to the collector electrode of said second transistor;

a voltage source, said collector of said selection transistor being connected to said voltage source through a resistor;

a differentiating network having an output for transmitting a selection pulse to the base electrode of said second transistor;

a source of supply voltage;

a third transistor having an emitter-collector path, said emitter-collector path forming a conducting path between said source of supply voltage and the collector of said second transistor.

6. The selection unit of claim 5, wherein said conducting path contains a resistor.

7. The selection unit of claim 6, wherein said conducting path resistor is located between said second and third transistors, a capacitor being connected across said conducting path resistor, a delay means connected before said second transistor and said differentiating network, and a source of negative voltage connected to the emitter electrode of said second transistor.

* * * * *

UNITED STATES PATENT AND TRADEMARK OFFICE

CERTIFICATE OF CORRECTION

PATENT NO. : 3,727,188

DATED : April 10, 1973

INVENTOR(S) : JOHANNES BERNARDUS HORSTEN

It is certified that error appears in the above-identified patent and that said Letters Patent are hereby corrected as shown below:

IN THE TITLE PAGE

Section [30] "701432" should be --7010432--.

Signed and Sealed this

*first* Day of *June 1976*

[SEAL]

*Attest:*

RUTH C. MASON
*Attesting Officer*

C. MARSHALL DANN
*Commissioner of Patents and Trademarks*